Patented July 26, 1949

2,477,435

UNITED STATES PATENT OFFICE 2,477,435

OXIDATION OF ETHYLENE TO ETHYLENE OXIDE AND OTHER OLEFINS TO THEIR OXIDES

Robert S. Aries, Short Beach, Conn.

No Drawing. Application July 30, 1947,
Serial No. 764,916

14 Claims. (Cl. 260—348.5)

This invention relates to a process for the manufacture of olefine oxides, particularly ethylene oxide, by the direct oxidation of the olefine, such as ethylene, in the presence of a novel catalyst, which secures high conversion of the olefine to the corresponding olefine oxide.

Various processes have been suggested for forming olefine oxides by the oxidation of olefines employing molecular oxygen, in the presence of surface catalysts which are silver-silver oxide combinations. Many references are found in the literature, including patents, on the method of preparation of catalysts of this type. These processes consist of: (1) slurrying silver oxide with water and then mixing a porous carrier with this slurry and evaporating the mixture to dryness; (2) precipitating silver oxide by means of a chemical reaction with a soluble silver salt, mixing the carrier with the precipitate and liquid in which it is suspended, then evaporating the mixture to dryness; (3) mixing carrier, silver oxide and a small amount of barium peroxide with water, and evaporating this mixture to dryness.

A catalyst prepared by slurrying silver oxide with water and carrier, then drying this mixture will result in a non-uniform surface coating on the carrier. Further, the particles of silver oxide are comparatively coarse and possess the minimum number of active centers per unit of area. Accordingly, the activity of catalysts of the aforesaid type cannot be the maximum.

It is an object of the present invention to provide an efficient and economical method for the catalytic oxidation of olefines to the corresponding olefine oxides, wherein the ratio of olefine oxide to by-products is substantially greater than that obtained by the use of heretofore known processes and by the use of heretofore employed silver or silver compound catalysts.

Still another object of the present invention is the provision of a catalyst which is particularly effective in selectively catalyzing the oxidation of olefines, particularly ethylene, to the corresponding olefine oxides and promoting high yields thereof.

Other objects and advantages will be apparent by reference to the following specification wherein the details and preferred embodiments of the invention are described.

In the present invention the oxidation of the olefine to the corresponding olefine oxide employing molecular oxygen is dependent on the use of a porous carrier coated with a uniform layer of uniformly sized, small particles of silver-silver oxide. This catalyst is prepared by depositing the silver-silver oxide on the carrier by impregnating the porous carrier with a solution of a silver salt of an organic acid and separating the excess liquid therefrom, both of which steps are under conditions which do not permit appreciable decomposition of this metallic salt, drying the impregnated carrier, then decomposing the silver salt by direct heat under controlled conditions. The premature formation of silver or silver oxide as referred to supra is to be avoided. It has been determined that if small amounts of silver and silver oxide were precipitated in the solution of the silver salt before or while the carrier was being dipped therein, the activity and selectivity of the resulting catalyst was seriously affected.

All precautions should be observed to eliminate, in so far as possible, this untimely decomposition to colloidal or solid particles. Heat and light hasten the decomposition of silver salts to metallic silver. A strong oxidizing agent, preferably one whose decomposition products are easily volatilized, such as for example hydrogen peroxide, is also preferably added to the aqueous solution of the silver salt. The oxidizing agent should have no residue of a metallic element after the catalyst has been activated. As high a vacuum as can be maintained commercially is used in the concentration of the diluted silver salt, subsequently explained, in order not to use an excessive temperature.

An aqueous solution of 55% strength of the silver salt is the optimum strength so that the porous carrier, when dried and activated, will have a sufficient amount of active silver-silver oxide complex impregnated in it. But concentrations of 25-75% inclusive can be employed, depending upon the concentration of the silver-silver oxide it is desired to have upon the carrier. The over-all range of silver concentration on the catalyst may be between substantially 6 and 12%. The optimum concentration is between 7 and 9%.

The temperature of the solution during impregnation of the carrier with the silver salt should be between about 100 and 125° C., and the period of time between about 1 and 5 hours.

The impregnated catalyst from which the excess water solution of the silver salt has been drained or filtered off, is dried, preferably at ordinary room temperature.

The catalyst is then converted into its active form by heating at elevated temperature of the order of 300 to 500° C. for a period of 12 to 18 hours in an inert gas. Nitrogen is preferably used. In this step the silver salt of the organic acid is converted to silver-silver oxide. It is not thought that either pure silver or pure silver oxide results from the thermal decomposition of the silver salt in the inert atmosphere but a combination of the two. Hydrogen gas should not be used during the reduction or activation step as the blanket gas, because although its use increases the activity of the catalyst toward the oxidation of ethylene, it decreases the selectivity of this oxidation reaction so that less ethylene oxide is produced. A good rate of flow for the nitrogen gas during the activation of the catalyst is preferably at a velocity of between 0.001 and 1.0 ft./sec. over the catalyst.

Two examples will be given to illustrate the practice of the invention, the second of which is preferred.

Example 1

Silver oxide was dissolved in an 85% strength water solution of lactic acid by the addition of the oxide in small amounts to this solution at a temperature of between 80 and 125° C. so as to form a 5-10% solution. An iron-free container was employed for this. This solution formed by the reaction of silver oxide with lactic acid was then concentrated to approximately 55% under a high vacuum. The last expediency permits the concentration to proceed at a lower temperature and thus minimizes decomposition of the solution into silver oxide. This solution is then filtered directly onto a porous carrier such as alumina or silicon carbide at about 100° C. and the carrier allowed to soak in the solution for a period of between 1 and 4 hours. At the end of the period the carrier is removed from the impregnating solution, drained, dried at room temperature and then decomposed at 400° C. for a period of time between 6 and 18 hours in a nitrogen stream flowing at the rate of a maximum velocity of 0.1 ft./sec. over the catalyst. The resulting catalyst has an active silver-silver oxide complex impregnated on it. The percentage Ag on the carrier should be between 7 and 9% for best results.

Example 2

Silver oxide was dissolved in an 85% strength water solution of lactic acid by the addition of the oxide in small amounts to this solution at a temperature of between 80 and 125° C. so as to form a 40-60% solution. In order to facilitate the solution of the silver oxide and to prevent the reduction, with attendant deposition of silver from the solution, there was added a small volume of 100 volumes hydrogen peroxide (30% hydrogen peroxide) up to 10 volume per cent of 100 volumes hydrogen peroxide. An iron-free container was employed. This solution was then filtered directly onto a porous carrier such as alumina or silicon carbide at about 100° C. and allowed to soak in the solution for a period of between 1 and 4 hours. At the end of the period the carrier is removed from the impregnating solution, drained, dried at room temperature and then decomposed at 400° C. for a period of time between 6 and 18 hours in a nitrogen stream flowing at the rate of a maximum velocity of 0.1 ft./sec. over the catalyst. The resulting catalyst has an active silver-silver oxide complex impregnated on it. The percentage Ag on the carrier should be between 7 and 9 for best results.

The method of reduction is extremely important as an excessive amount of heat caused by the combustion of the organic material will result in a poor catalyst. A good method of decomposition is to raise the temperature of the reduction chamber up to about 400° C. in about 2 to 3 hours and pass a stream of nitrogen over the catalyst at a maximum velocity of 0.1 ft./sec. This stream of $N_2$ should be kept flowing over the catalyst during the decomposition period which period is preferably for a total of between 10 and 18 hours but not limited to this length of time.

The catalyst was then placed in a ¾ inch diameter x 3 foot jacketed reactor, whereupon the following operating conditions in the oxidation were employed:

| | |
|---|---|
| Jacket fluid temperature °C | 268 |
| Oxidizing gas | air |
| Per cent ethylene in feed | 3.5 |
| Contact time secs | 4.4 |

Employing the aforesaid method as set out in this example, wherein the percent of silver on the catalyst was 6.7%, the percent conversion of ethylene was 89%, and the yield of ethylene oxide based on the ethylene converted was 67%.

Another catalyst containing 7.3% Ag (by analysis), prepared by the method set out in this same Example 2, when tested at 262° C. and for a contact time of 3.7 secs., gave 94% conversion and a yield of 60% ethylene oxide based on the ethylene converted. In that run the same per cent ethylene in the feed was used as previously designated, and air was used as the oxidizing gas.

Another catalyst containing 11.5% Ag by analysis, prepared by the method in Example 1, when tested at 220° C. at an ethylene space velocity of 5.5 cu. ft. ethylene per cu. ft. of catalyst, wherein an ethylene concentration in air of 3.5% was employed, gave 89% conversion of the ethylene and a yield of 60% ethylene oxide based on the ethylene converted.

In each of these three runs that rate of passage of the ethylene air mixture was chosen so that the conditions were favorable for the maximum conversion of ethylene to its corresponding oxide. The overall temperature difference between the temperature of the heat exchange medium and the exit temperature of the reaction mixture did not exceed 20° C. and the oxidation was carried out at substantially atmospheric pressure.

From these test runs it can be seen that the catalyst of the present invention is highly active both as to oxide conversion and as to selectivity of conversion to the corresponding olefine oxide.

Variations in the specific procedures shown in the foregoing example will be apparent and may be adopted without departing from the essentials of this invention. While it is preferred to dry the impregnated carrier as a separate step it can be readily understood that the drying step can be made a part of the decomposition step in as much as water would be removed by the heat before the decomposition temperature is attained. While air is the source of molecular oxygen in the examples, oxygen itself can be used.

This invention is not to be limited by any specific examples, which are solely for purposes of illustration, or theoretical explanations presented herein, as it is desired to claim all novelty in so far as the prior art permits. In the claims the term "free oxygen containing gas" is used in the sense as generic to both free oxygen and a gas which contains molecular oxygen, more particularly air.

I claim as my invention:

1. In the process for the production of olefine oxides, the steps comprising passing a mixture of an olefine in the gaseous state and free oxygen containing gas over a solid porous catalyst at a temperature of substantially 200–300° C., the amount of olefine employed being less than the stoichiometric quantity necessary to combine with the oxygen to form the olefine oxide, the said catalyst being prepared by impregnating a porous carrier with an aqueous solution of a silver salt of an organic acid at a temperature of about 100 to 125 degrees C. in the presence of an oxidizing agent whose decomposition products are volatile below 300° C., removing surplus liquid and drying the impregnated carrier, thereafter decomposing the said deposited silver salt by heating the impregnated carrier at between substantially 300 and 500° C. in the presence of an inert gas for several hours.

2. In the process for the production of ethylene oxide, the steps comprising passing a mixture of ethylene and free oxygen containing gas over a solid porous catalyst at a temperature of substantially 200–300° C., the amount of ethylene employed being less than the stoichiometric quantity to combine with the oxygen to form ethylene oxide, the said catalyst being prepared by impregnating a porous carrier with an aqueous solution of a silver salt of an organic acid at a temperature of about 100 to 125 degrees C. containing an oxidizing agent whose decomposition products are volatile below 300° C., removing surplus liquid and drying the impregnated carrier, thereafter decomposing the said deposited silver salt by heating the impregnated carrier at between substantially 300 and 500° C. in the presence of an inert gas for several hours.

3. In the process for the production of olefine oxides, the steps comprising passing a mixture of an olefine in the gaseous state and free oxygen containing gas over a solid porous catalyst at a temperature of substantially 200–300° C., the amount of olefine employed being less than the stoichiometric quantity necessary to combine with the oxygen to form the olefine oxide, the said catalyst being prepared by impregnating a porous carrier with an aqueous solution of a silver salt of an organic acid of 25–75% strength and hydrogen peroxide, removing surplus liquid and drying the impregnated carrier at substantially 100–125° C., thereafter decomposing the said deposited silver salt by heating to between 300 and 500° C. for a period of several hours in the presence of nitrogen gas flowing at a velocity of between 0.001 and 1.0 ft./sec. over the catalyst.

4. In the process for the production of ethylene oxide, the steps comprising passing a mixture of ethylene and free oxygen containing gas over a solid porous catalyst at a temperature of substantially 200–300° C., the amount of ethylene employed being less than the stoichiometric quantity necessary to combine with the oxygen to form ethylene oxide, the said catalyst being prepared by impregnating a porous carrier with an aqueous solution of a silver salt of an organic acid of 25–75% strength and hydrogen peroxide, removing surplus liquid and drying the impregnated carrier at substantially 100–125° C., thereafter decomposing the said deposited silver salt by heating to between 300 and 500° C. for a period of several hours in the presence of nitrogen gas flowing at a velocity of between 0.001 and 1.0 ft./sec. over the catalyst.

5. In the process for the production of olefine oxides, the steps comprising passing a mixture of an olefine in the gaseous state and free oxygen containing gas over a solid porous catalyst at a temperature of substantially 200–300° C., the overall temperature difference between that of the heat exchange medium and the exit temperature of the reaction mixture not exceeding 30° C., and the reaction being carried out at substantially atmospheric pressure, the amount of olefine employed being less than the stoichiometric quantity necessary to combine with the oxygen to form the olefine oxide, the said catalyst being prepared by impregnating a porous carrier with an aqueous solution of a silver salt of an organic acid at a temperature of about 100 to 125 degrees C. in the presence of an oxidizing agent whose decomposition products are volatile below 300° C., removing surplus liquid and drying the impregnated carrier, thereafter reducing the said deposited silver salt by heating the impregnated carrier at between substantially 300 and 500° C. in the presence of an inert gas for several hours.

6. In the process for the production of ethylene oxide, the steps comprising passing a mixture of ethylene and free oxygen containing gas over a solid porous catalyst at a temperature of substantially 200–300° C., the overall temperature difference between that of the heat exchange medium and the exit temperature of the reaction mixture not exceeding 30° C., and the reaction being carried out at substantially atmospheric pressure, the amount of ethylene employed being less than the stoichiometric quantity to combine with the oxygen to form ethylene oxide, the said catalyst being prepared by impregnating a porous carrier with an aqueous solution of a silver salt of an organic acid at a temperature of about 100 to 125 degrees C. in the presence of an oxidizing agent whose decomposition products are volatile below 300° C., removing surplus liquid and drying the impregnated carrier, thereafter decomposing the said deposited silver salt by heating the impregnated carrier at between substantially 300 and 500° C. in the presence of an inert gas for several hours.

7. In the process for the production of a highly active silver-silver oxide catalyst, highly active in the oxidation of ethylene to ethylene oxide, which comprises impregnating a porous carrier free of alkali metals, iron and chromium with an aqueous solution of 55–75% strength of a silver salt of an organic acid held at a temperature of substantially 100–125° C. and containing an oxidizing agent whose decomposition products are volatile below 300° C., removing surplus liquid and drying the impregnated carrier carried out in the presence of an oxidizing agent which leaves no residue of a metallic element after the subsequent decomposition step, thereafter decomposing the said deposited silver salt by heating the impregnated carrier at between substantially 300 and 500° C. in the presence of an inert gas for several hours.

8. In the process for the production of a highly active silver-silver oxide catalyst, highly active in the oxidation of ethylene to ethylene oxide, which comprises impregnating a porous carrier free of alkali metals, iron and chromium with an aqueous solution of 25–75% strength of a silver salt of an organic acid held at 100–125° C. substantially and containing an oxidizing agent whose decomposition products are volatile below 300° C., removing surplus liquid and drying the impregnated carrier, thereafter decomposing the said deposited silver salt by heating the impregnated carrier at between substantially 300 and 500° C. in the presence of an inert gas for several hours.

9. In the process for the production of a highly active silver-silver oxide catalyst, highly active in the oxidation of ethylene to ethylene oxide, which comprises impregnating a porous carrier free of alkali metals, iron and chromium with an aqueous solution of 25-75% strength of a silver salt of an organic acid held at substantially 100-125° C. and containing hydrogen peroxide, removing surplus liquid and drying the impregnated carrier, thereafter decomposing the said deposited silver salt by heating the impregnated carrier at between substantially 300 and 500° C. in the presence of an inert gas for several hours.

10. In the process for the production of a highly active silver-silver oxide catalyst, highly active in the oxidation of ethylene to ethylene oxide, which comprises impregnating a porous carrier free of alkali metals, iron and chromium with an aqueous solution of 25-75% strength of a silver salt of an organic acid held at substantially 100-125° C. and containing an oxidizing agent whose decomposition products are volatile below 300° C., removing surplus liquid and drying the impregnated carrier, thereafter decomposing the said deposited silver salt by heating the impregnated carrier at between substantially 300 and 500° C. for a period of several hours in the presence of nitrogen gas flowing at a velocity of between 0.001 and 1.0 ft./sec. over the catalyst.

11. In the process for the production of a highly active silver-silver oxide catalyst, highly active in the oxidation of ethylene to ethylene oxide, which comprises impregnating a porous carrier free of alkali metals, iron and chromium with an aqueous solution of 55-75% strength of a silver salt of an organic acid for a period of substantially 1-5 hours and at a temperature of substantially 100-125° C, which solution contains hydrogen peroxide, removing surplus liquid, drying the impregnated carrier, thereafter decomposing the said deposited silver salt by heating the impregnated carrier at substantially 300-500° C. for a period of several hours in the presence of nitrogen stream flowing at a velocity of between 0.001 and 1.0 ft./sec. over the catalyst.

12. In the process for the production of a highly active silver-silver oxide catalyst, highly active in the oxidation of ethylene to ethylene oxide, which comprises impregnating a porous carrier free of alkali metals, iron and chromium with an aqueous solution of substantially 40-60% strength of silver lactate at a temperature of substantially 100-125° C. for a period of between 1 and 5 hours substantially, which solution contains an oxidizing agent whose decomposition products are volatile below 300° C., removing surplus liquid, drying the impregnated carrier, the aforesaid steps in preparing the catalyst being carried out in the presence of an oxidizing agent which leaves no residue of a metallic element after the subsequent decomposition step, thereafter decomposing the said deposited silver salt by heating the impregnated carrier at between 300 and 500° C. for a period of several hours in an atmosphere of nitrogen.

13. In the process for the production of a highly active silver-silver oxide catalyst, highly active in the oxidation of ethylene to ethylene oxide, which comprises impregnating a porous carrier free of alkali metals, iron and chromium with an aqueous solution of substantially 40-60% strength of silver lactate at a temperature of substantially 100-125° C. for a period of between 1 and 5 hours substantially, which solution contains an oxidizing agent whose decomposition products are volatile below 300° C., removing surplus liquid, drying the impregnated carrier, the aforesaid steps in preparing the catalyst being carried out in the presence of an oxidizing agent which leaves no residue of a metallic element after the subsequent decomposition step, thereafter decomposing the said deposited silver salt by heating the impregnated carrier at between 300 and 500° C. for a period of substantially 12-18 hours in a nitrogen stream flowing at a velocity between 0.001 and 1.0 ft./sec. over the catalyst.

14. In the process for the production of a highly active silver-silver oxide catalyst, highly active in the oxidation of ethylene to ethylene oxide, which comprises impregnating a porous carrier free of alkali metals, iron and chromium with an aqueous solution of substantially 40-60% strength of silver lactate at a temperature of substantially 100-125° C. for a period of between 1 and 5 hours substantially, said soluting being free from metallic silver and silver oxide during the impregnation step, draining off surplus liquid, drying the impregnated catalyst, and thereafter decomposing it at between 300 and 500° C. for a period of between 12 and 18 hours in a nitrogen stream flowing at a velocity of 0.001 to 1.0 ft./sec. over the catalyst.

ROBERT S. ARIES.

REFERENCES CITED

The following references are of record in the file of this patent:

UNITED STATES PATENTS

| Number | Name | Date |
|---|---|---|
| 2,005,645 | Bond | June 18, 1935 |
| 2,040,782 | Van Peski | May 12, 1936 |
| 2,231,446 | Grosse | Feb. 11, 1941 |
| 2,294,383 | Carter | Sept. 1, 1942 |
| 2,404,438 | Evans | July 23, 1946 |